United States Patent [19]
Richards

[11] 3,748,941
[45] July 31, 1973

[54] GUIDE PIN ASSEMBLY FOR DIE PLATE
[75] Inventor: Robert E. Richards, Kalamazoo Twp., Kalamazoo County, Mich.
[73] Assignee: J. A. Richards Co., Kalamazoo, Mich.
[22] Filed: July 30, 1971
[21] Appl. No.: 167,654

[52] U.S. Cl.................. 83/637, 83/698, 85/5 N, 308/4 C, 151/41.7
[51] Int. Cl............................................. B26d 5/08
[58] Field of Search.................... 151/41.7; 85/5 N; 83/637, 638, 698; 287/20.5, 20; 308/4 C

[56] References Cited
UNITED STATES PATENTS
| | | | |
|---|---|---|---|
| 3,430,674 | 4/1969 | Forbush | 151/41.7 |
| 1,081,940 | 12/1913 | Davis | 85/5 N |
| 3,219,371 | 11/1965 | Danly | 308/4 C |
| 2,356,387 | 8/1944 | Danneman | 308/4 C |

Primary Examiner—Andrew R. Juhasz
Assistant Examiner—W. D. Bray
Attorney—Woodhams, Blanchard and Flynn

[57] ABSTRACT

A guide pin assembly mountable upon die parts, said pin assembly having an enlarged frustoconical head which tapers toward the free end thereof and a cylindrical shank which is snugly receivable into aligned openings in first and second die parts to hold them in predetermined relative positions. Further openings are provided in the first die part adjacent to and at a constant radius from the axis of the guide pin, for the reception of screws having frustoconical heads which taper away from the free ends thereof at about the same angle of taper as the head on said guide pin. The heads on the screws firmly engage the head on the guide pin, to hold the guide pin within its opening.

10 Claims, 5 Drawing Figures

PATENTED JUL 31 1973  3,748,941
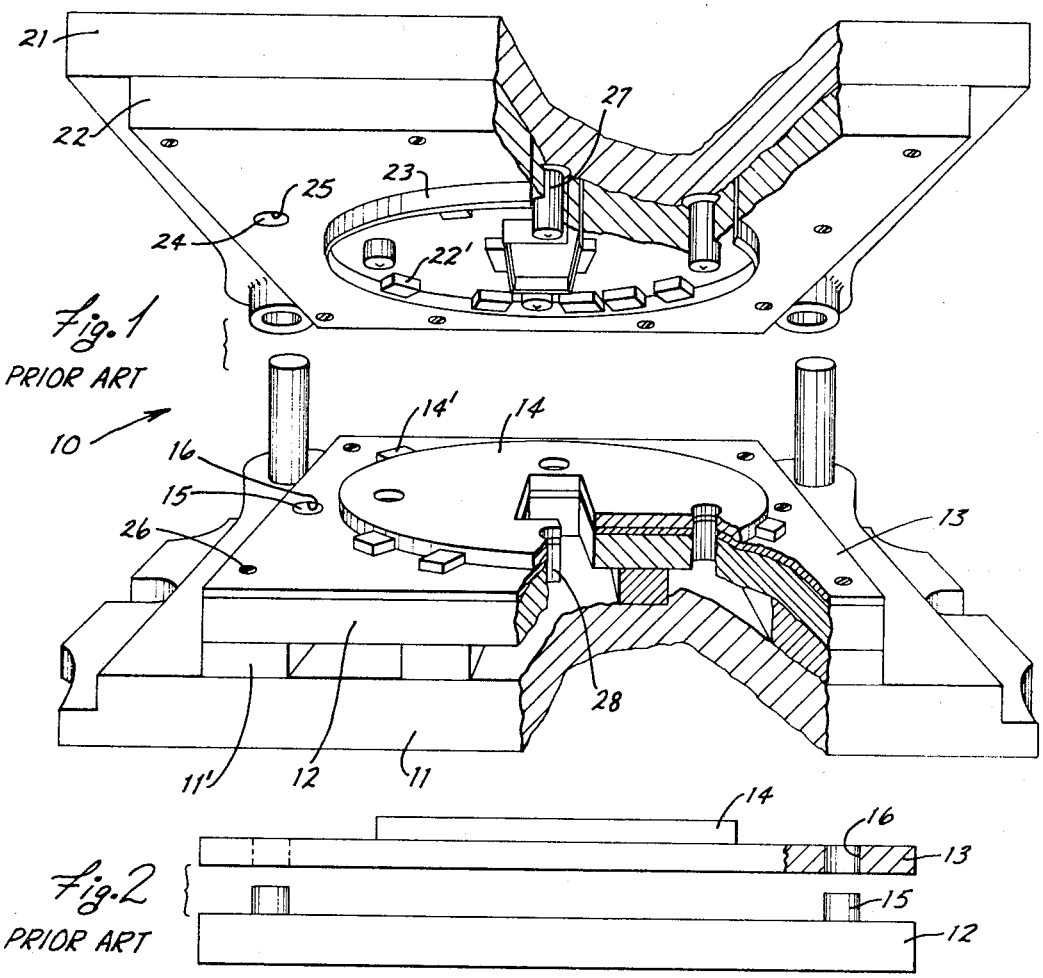
Fig.1 PRIOR ART
Fig.2 PRIOR ART
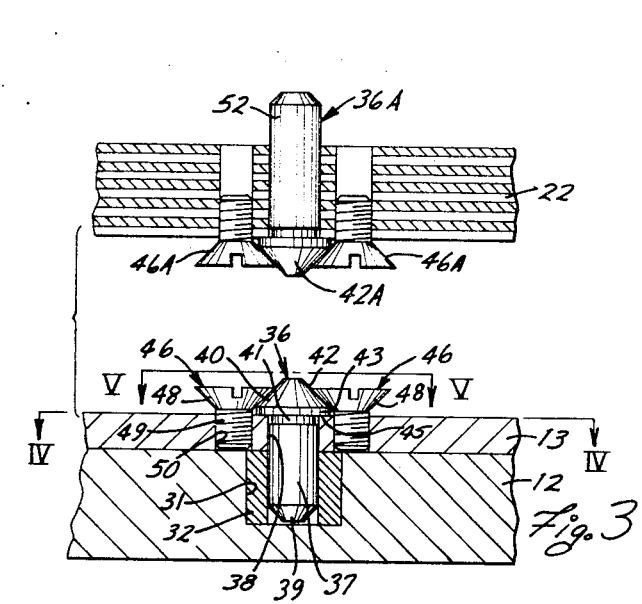
Fig.3
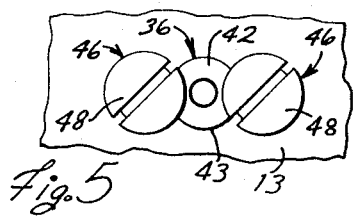
Fig.5
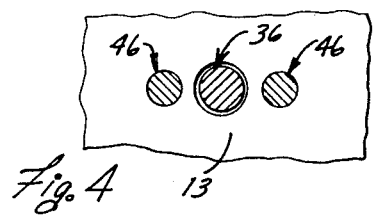
Fig.4
INVENTOR
ROBERT E. RICHARDS
BY
Woodhams, Blanchard & Flynn
ATTORNEYS

GUIDE PIN ASSEMBLY FOR DIE PLATE

FIELD OF THE INVENTION

This invention relates to a guide pin assembly and, more particularly, relates to a guide pin construction for accurately aligning opposed, upper and lower die plates, wherein the guide pins can be attached to the die plates even though they are made of a material unsuitable for conventional fastening by welding or direct threaded engagement.

BACKGROUND OF THE INVENTION

It has been a common practice in the past to mount a lower die plate on a subdie plate in fixed but removable relation thereto. The purpose has been to allow the exchange of the lower die plates on the subdie plate to cut or punch a variety of workpieces. An upper die plate is attached to a movable upper die shoe. The opposed dies must be in accurate registry with each other to avoid damage to the cutting rule or punch on the dies during the cutting operation and to insure proper and accurate cutting of the workpiece.

To this end, guide pins are normally carried by either the lower die plate or the subdie plate to coact with holes in the other one thereof so that when different die plates are installed on the subdie plate and shoe, the die plates will be accurately positioned relative to each other. However, the die plates are typically of a material, such as wood or thin soft metal, which is incapable of fixedly mounting a conventional cylindrical guide pin and maintaining such guide pin fixedly located thereon for prolonged periods of time and during a number of cycles of use. In consequence, it has been conventional to mount the guide pins by welding or threaded engagement to the subdie plate, which is normally of substantially sturdier construction than the die plate and may, for example, be a heavy steel plate. However, the holes in the die plate through which the guide pins are received have been found to wear and enlarge after a number of cycles of use, due to contact with the pin. As a result of the enlarged clearance between the guide pin and the corresponding hole in the die plate, the die plate can shift laterally with respect to the subdie plate or shoe. Such misalignment of the die plates can result in a defective workpiece and/or damage to the cutting rule or punch, which increases the cost of workpiece production, due to excessive down-time, loss of materials and maintenance charges.

Accordingly, the objects and purposes of this invention include provision of:

A guide pin assembly capable of mounting on a die plate made from material which is unsuitable for attachment to the guide pin by means of threaded engagement, welding or the like;

A guide pin assembly, as aforesaid, in which the guide pin may be fixed to a die plate with substantial rigidity to enable accurate registry of the die plate and a subdie plate having a hole for receiving a free end of said guide pin, and which will maintain registration accuracy over a large number of cycles of use and exchange;

A guide pin assembly, as aforesaid, which makes it unnecessary to mount the guide pin rigidly on the subdie plate and which eliminates die plate wear due to contact thereof with the guide pin;

A guide pin assembly, as aforesaid, which can be readily incorporated in the construction of new guide plates and which can be adapted to use with existing guide plates; and A guide pin assembly, as aforesaid, which, while particularly suited for fixedly mounting a die plate guide pin, is also adaptable for mounting other pin or rod-like members for a variety of guiding purposes.

Other objects and purposes of this invention will be apparent to persons acquainted with structures of this general type upon reading the following specification and inspecting the accompanying drawings, in which:

FIG. 1 is a partially broken, perspective view disclosing a conventional steel rule die assembly and illustrating a prior art construction for aligning die plates on a subdie plate or die shoe.

FIG. 2 is a broken front view of part of the apparatus of FIG. 1 disclosing the prior art method for mounting guide pins.

FIG. 3 is an enlarged cross-sectional view disclosing the guide pins mounted in accordance with the present invention on conventional die plates.

FIG. 4 is a sectional view taken along the line IV—IV in FIG. 3.

FIG. 5 is a sectional view taken along the line V—V in FIG. 3.

SUMMARY OF THE INVENTION

The objects and purposes of this invention are met by providing a guide pin provided with an enlarged frustoconical head which tapers toward the free end thereof, and a substantially cylindrical shank which is snugly receivable into openings in first and second die parts to effect accurate alignment of the two die parts when the same are brought together. The guide pin is secured to the die plate by screws attached thereto at uniform intervals around said guide pin. The screws have frustoconical heads which taper away from the free ends thereof at about the same angle of taper as the head on said guide pin for engagement with said head to hold the guide pin firmly within its opening in the first die part.

DETAILED DESCRIPTION

To illustrate the environment which gave rise to the present invention, FIG. 1 illustrates a conventional steel rule die assembly 10 for use on a die press (not shown) and which includes a stationary lower die shoe 11 having a subdie plate 12 fixedly mounted thereon with slug parallels 11' disposed therebetween. A thin lower die plate 13, often constructed of a relatively soft metal, is removably attached to the subdie plate 12. The lower die plate 13 supports a male punch 14 located between stripper pads 14'.

In the past, the lower die plate 13 has been positioned relative to the subdie plate 12 by means of pins 15 fixedly secured to the subdie plate 12 (FIG. 2), which pins are adapted to be snugly received within openings 16 formed in the lower die plate 13.

The die assembly 10 (FIG. 1) also conventionally includes a movable upper die shoe 21 having an upper die plate 22, which may be constructed from laminated wood. The upper die plate 22 has a steel rule die 23 mounted thereon and stripper pads 22' disposed for coaction with the punch 14. The upper die plate 22 is aligned relative to the upper die shoe 21 by means of pins 24 fixedly secured to the upper die shoe 21 and projecting downwardly into the openings 25 formed in the upper die plate 22.

In addition to the steel rule die 23, the upper die plate may carry pierce punches 27 of various sizes and shapes which coact with coaxial holes 28 through the punch 14, lower die plate 13 and subdie plate 12. Screws 26 connect the upper die plate 22 to the upper die shoe 21, and connect the lower die plate 13 to the subdie plate 12.

In the past, as above described, the guide pins 15 and 24 have been fixedly secured to their respective supports 12 and 21.

The present invention is concerned with the replacement of the guide pins 15 and 25 by the pins 36 and 36A, respectively, (FIG. 3) which are attached directly to the die plates.

Specifically, as illustrated in FIG. 3, the subdie plate 12 is provided with an opening 31 in which is preferably positioned a wear sleeve 32. A lower guide pin construction includes a guide pin 36 having a substantially cylindrical shank 37 which is snugly received in and extends downwardly through an opening 38 in the die plate 13 and then into the wear sleeve 32 for accurately aligning the die plate 13 with the subdie plate 12. The lower end of the shank 37 is preferably chamfered at 39 to facilitate reception thereof into the wear sleeve 32. It will be recognized that under certain circumstances, and depending on the material of the subdie plate 12, the wear sleeve 32 can be omitted, the opening 31 then being sized to snugly receive the shank 37 of the guide pin therein.

The guide pin 36 has a head 40 integral with the upper end of the shank 37 which preferaby has a portion 41 of reduced diameter immediately adjacent the head. The head 40 is coaxial with the shank 37 and has a frustoconical peripheral surface 42 which tapers toward its free upper end. The portion 43 of the head 40, immediately adjacent the shank 37, is preferably cylindrical.

In its normal position of installation, the under surface 45 of the head 40 on the guide pin 36 rests firmly upon the upper surface of the die plate 13. A plurality of fastening devices, such as flat head machine screws 46, are provided for holding the head 40 of the guide pin 36 firmly against the upper surface of the die plate 13. The screws 46 are uniformly distributed around and spaced from the axis of the hole 38. The screws 46, which are preferably identical, are each provided with a frustoconical head 48 which tapers downwardly at an angle preferably about identical to the taper of the frustoconical surface 42 on the guide pin 36.

The frustoconical head 48 of each screw 46 firmly contacts the frustoconical surface 42 of the guide pin head 40 and establishes a substantially continuous line contact therewith. The screws 46 are firmly fastened to the die plate 13 and, through a wedging action resulting from the aforementioned contact of the heads 48 with the head 40, firmly hold the guide pin head 40 against the upper surface of the die plate 13.

The taper angle, defined between the axis of each screw 46 and the tapered periphery of its head 48, normally lies in a range from approximately 35° to 55°, depending on the type of screw utilized. However, it is contemplated that fastening devices having a taper angle lying within a wider range can be utilized if desired.

The screws 46 each include a shank 49 which extends downwardly from the head 48 for threaded engagement within openings 50 in the die plate 13. The openings 50 are uniformly distributed around and with respect to the axis of the guide pin opening 38 in the die plate 13. The spacing of the openings 50 from the axis of the opening 38 is preferably such that the tapered heads 48 of the screws 46 engage the pin head 40 before they engage the upper surface of the die plate 13, thus ensuring a firm contact between the tapered surfaces on the heads 48 and 42.

Although, in the particular embodiment shown, a pair of screws 46 are used to secure the guide pin 36 to the die plate 13, it is contemplated that more than two such fastening devices may be employed.

The guide pin 36 is maintained perpendicular to the die plate 13, not only by the snug surrounding relationship of the sidewall of the opening 38 with the shank 37, but also by the forceful urging of the lower radial face 45 of the head 41 against the upper surface of the die plate 13 by the screws 46.

The guide pin construction including the pin 36A (FIG. 3) is preferably similar to that discussed above with respect to the die pin 36. Thus, the conical surface 42A on guide pin 36A is engaged by the conical heads on the screws 46A which are preferably identical to the screws 46 described above. The upper guide pin 36A is also similar to the guide pin 36, except that the upper guide pin 36A may be provided with a longer shank 52 so that the free end of the shank will extend beyond the upper surface of the thicker upper die plate 22 for engagement with the upper die shoe 21 (FIG. 1) in a manner generally similar to that discussed above with respect to the subdie plate 12. The plurality of spaced screws 46A threadedly engage the wooden upper die plate 22 for rigidly, though removably, securing the upper die pin 36A to the upper die plate 22.

Although the heads of the guide pins 36 and 36A extend beyond the opposed faces of their respective die plates 13 and 22, they do not interfere with the movement of said plates because of the spacing maintained between the opposed faces of said die plates 13 and 22 by the steel rule die 23.

OPERATION

Installation of the above-described guide pin assemblies, in either new or existing dies, is simple and requires a minimum of technical skill and tools. More particularly, suitable aligned openings 38 and 31 are provided in the die plate 13 and subdie plate 12, respectively, and the wear sleeve 32 is inserted in opening 31. The openings 50 are produced in the die plate 13 and, in a preferred embodiment, are threaded. The openings 50 are located uniformly around and from the axis of opening 38.

Thereafter, the guide pin 36 is inserted into the opening 38 with the lower surface 45 of its head 40 bearing upon the upper surface of the die plate 13. The screws 46 are then threaded into the threaded openings 50 and tightened until they urge the guide pin head 40 firmly against the upper face of the die plate 13. This completes installation of a lower guide pin assembly on the die plate 13.

When the die plate 13 has been provided with guide pins 36 in any desired number and location, the die plate 13 may then be installed on the subdie plate 12 by bringing them together so that the shanks 37 of the guide pins 36 are received into the corresponding openings 38 in the wear sleeves 32 in the subdie plate 12 whereby the plate 13 is held in a predetermined position upon the subdie plate 12. Thereafter, means such as the above-described screws 26 (FIG. 1) may be utilized to fasten the die plate 13 to the subdie plate 12.

Mounting of the wooden die plate 22 upon its die shoe 21 by means of die pins 36A is carried out in a manner similar to that described above with respect to die plate 13, subdie plate 12 and the guide pins 36.

It should be noted that each guide pin assembly includes only one or a few unitary fastening devices, preferably screws, for holding the guide pin in fixed relation to the die plate 13. That is, no additional parts, such as extra clamping plates, clips or the like, are required.

The guide pin assembly in accordance with the present invention has been described in terms of use with die plates, and, more particularly, die plates of thin soft metal or wood. However, it is contemplated that the guide pin construction of the present invention is usable in other situations as well, wherein guide pins are required, including use with die plates of other materials and thicknesses.

Thus, although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A guide pin assembly for a removable die plate comprising in combination:
   an elongated guide pin having a shank adapted for reception into and extension through an opening in a die plate, and having a head on one end thereof for bearing against a side of said plate;
   plural fastening members each attachable to said plate and distributed around said opening, said fastening members each having a head projecting beyond said side and overlapping and contacting a differing portion of said guide pin head to positively fix said guide pin head in an installed position against said side of said plate.

2. The assembly defined in claim 1, wherein said head of said guide pin has a frustoconical portion;
   wherein said heads of said fastening members have frustoconical portions which taper in an axial direction substantially opposite to the direction of taper of the frustoconical portion of said head of said guide pin, said frustoconical portions of said fastening members bearing on said frustoconical portions of said guide pin in substantially continuous line contact for holding said guide pin in place on said plate.

3. A guide pin assembly for a removable die plate comprising in combination:
   an elongated guide pin having a shank adapted for reception into and extension through an opening in a die plate, and having a head on one end thereof for bearing against a side of said plate, said head having surfaces converging away from said side;
   fastening means attachable to said plate and projecting beyond said side, said means having a portion overlapped and engaged with at least one part of said surfaces to positively obstruct movement of said guide pin away from said side of said plate, said fastening means comprising a plurality of screws having tapered heads engageable with the head of each guide pin, said screws being uniformly disposed around and spaced from said guide pin, the converged surfaces of said head of said guide pin being conical, the axes of said heads of said screws and said guide pin being parallel and the angle of taper of said heads of said scrwes being identical to the angle of taper of said head of said guide pin, the tapered surfaces of said screws being firmly engageable with the conical portion of the head of said guide pin for holding said guide pin head firmly against said plate.

4. The assembly defined in claim 3 in which said guide pin has a shank which extends at its free end beyond said plate, the free end of said guide pin shank being receivable into a corresponding opening of a plate support member to locate said plate accurately relative to said plate support member, said shank having a portion of reduced diameter adjacent said head to permit unobstructed engagement of said head with said side of said plate.

5. The assembly defined in claim 3 in which said head of said guide pin has a cylindrical portion located immediately adjacent said shank which is of relatively short axial extent, whereby said head of said guide pin can be firmly engaged by said heads of said screws before said screw heads can engage said plate.

6. The assembly defined in claim 3 in which only two said screws are provided for each guide pin, said screws being disposed on diametrically opposite sides of said guide pin and the heads of said screws overlying diametrically opposite portions of said guide pin head.

7. In a die assembly, the combination comprising:
   a die plate adapted for carrying a die element;
   a subdie plate adapted for removably carrying said die plate;
   means defining first and second transverse holes in said die plate and said subdie plate, respectively, said die plate and subdie plate being accurately positioned relative to each other only when said holes are coaxial;
   a guide pin having a shank snugly but slidably receivable through said first opening and into said second opening when they are coaxial, said guide pin having a head which bears against that side of said die plate remote from said subdie plate, said head extending beyond said side of said die plate, said head having a portion converging away from said die plate; and
   unitary fastening means attachable to said die plate, said fastening means including tapered head means overlying and engaging said converging portion of said head of said guide pin for holding said guide pin in fixed relation with said die plate.

8. The die assembly defined in claim 7 in which said fastening means comprises a plurality of machine screws, said tapered heads thereof being frustoconical and having substantially the same angle of taper as the convergence of said head of said guide pin and said screws having threaded shank portions which threadedly engage said die plate, the frustoconical portions of said screws engaging the converging portion of said guide pin head for urging said guide pin head firmly against said remote surface of said die plate and thereby holding said guide pin rigidly with respect to said die plate.

9. The die assembly defined in claim 8 in which said die plate is of relatively thin, soft metal.

10. The die assembly defined in claim 8 in which said die plate is of wood.

* * * * *